Aug. 25, 1931.   H. S. C. BACON   1,820,209
EDUCATIONAL DEVICE
Filed Nov. 20, 1929
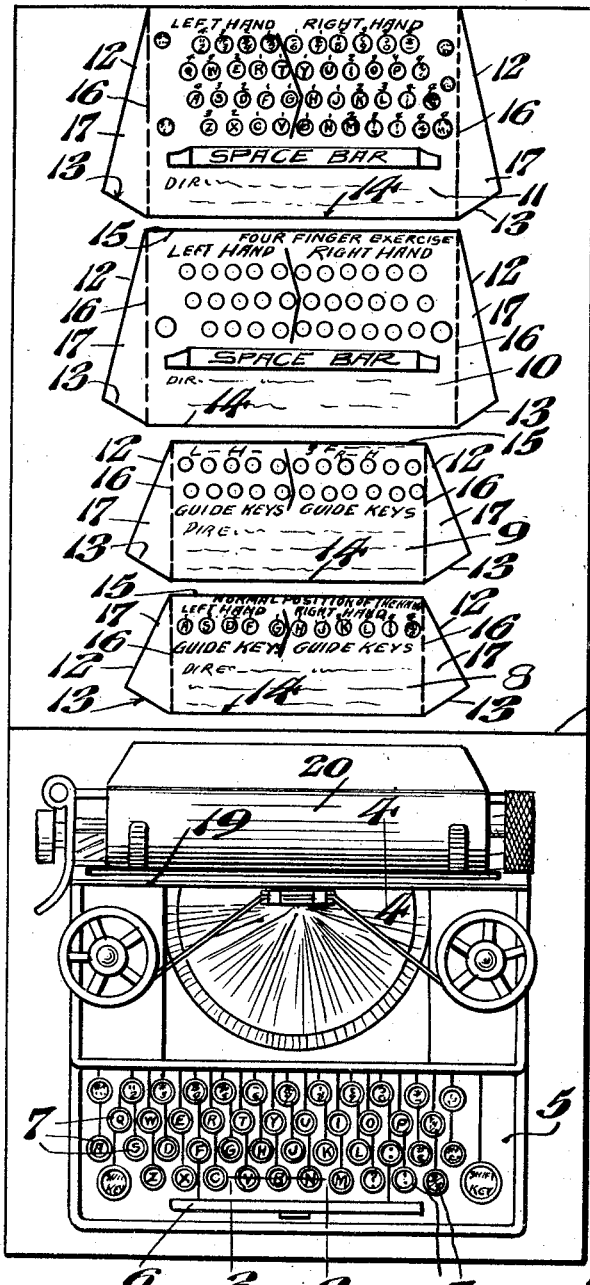
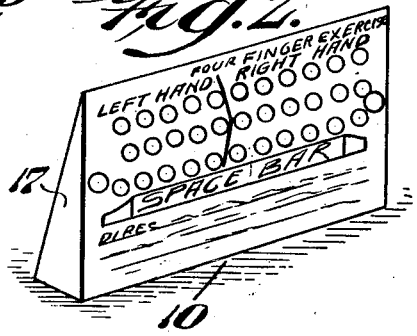
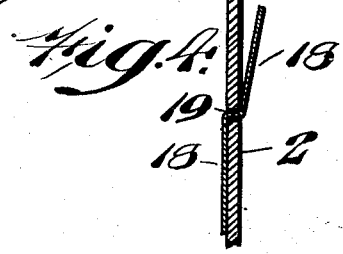
INVENTOR.
HARRY S. C. BACON.
BY
ATTORNEYS.

Patented Aug. 25, 1931

1,820,209

UNITED STATES PATENT OFFICE

HARRY S. C. BACON, OF PHILADELPHIA, PENNSYLVANIA, ASSIGNOR TO KETTERLINUS LITHOGRAPHIC MFG. CO., OF PHILADELPHIA, PENNSYLVANIA, A CORPORATION OF PENNSYLVANIA

EDUCATIONAL DEVICE

Application filed November 20, 1929. Serial No. 408,448.

My invention relates to a new and useful educational device, and it consists more particularly of a novel educational chart, which lends itself to amusement, instruction and advertising purposes, particularly in connection with a typewriter of any conventional form.

My invention still further relates to a novel chart, particularly adapted to facilitate the instruction of typewriting and one which, in addition to advertising the various features of the particular machine to which it is adapted, also serves to lighten and facilitate the task of mastering the typewriter keyboard.

To the above ends my invention consists of an integral chart inscribed upon a substantially rectangular or other shaped sheet of pasteboard, cardboard, paper, or the like, including a representation of a typewriting machine at the foot of said chart with a superimposed plurality of sectional detachable finger exercises constituting graded typewriting lessons for beginners, which the student is enabled to take up in the proper sequence according to suitable instructions supplied thereon.

My invention further relates to a novel chart of this character, which is adapted for use in conjunction with typewriting lessons or finger exercises not formed integral therewith, but which are either composed for the purpose by the individual instructor or which may be supplied independently of the device proper.

My invention further consists in a novel chart of this character from which the lesson to be practiced may be cut out and its ends folded to form a self supporting easel construction which is readily visible during use.

My invention still further consists in a novel chart of this character wherein the simulation or representation of the buttons of the key-board of a typewriting machine are raised or embossed or formed in relief so as to give the user the feel or touch of actual typewriter keys, thereby imparting to the user the requisite accuracy of the "touch" system.

My invention further consists in other novel features of construction and advantage, all as will be hereinafter described and finally claimed.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings:—

Figure 1 represents a plan view of a novel educational chart or device, embodying my invention.

Figure 2 represents a perspective view of one of the practice lesson sections shown detached.

Figure 3 represents a section of the raised key-board on line 3—3 of Fig. 1.

Figure 4 represents a section on line 4—4 of Figure 1.

Referring to the drawings, in which like reference characters indicate like parts, 1 designates an educational device or chart embodying my invention composed of a sheet of cardboard, pasteboard or the like having the lower section 2 and the upper section 3 which are separated by the crease or scoring 4. On the lower section 2 is delineated a typewriting machine having a complete key-board 5 and a spacer bar 6. The buttons of the key-board 5 are raised or formed in relief or embossed so that each separate key 7 stands out above the level or plane of the lower section 2, thereby accurately simulating the touch or feel of an ordinary typewriter key as found on actual working machines, as will be understood from Fig. 3. In the upper section 3 are provided the sectional segregated practice lessons 8, 9, 10 and 11, each of which directs the student to practice certain given characters to be punched by the proper fingers of the right and left hands. Each of the sectional lessons 8, 9, 10 and 11 is separated from the section 3 by the scorings or creases 12, 13, 14 and 15, along which lines any of said sectional lessons may be cut or detached from the main or body portion 3. Each of the sectional lessons 8, 9, 10 and 11 is provided with the creases 16 which together with the juxtaposed creases 12 and 13 form triangular flaps 17. When a lesson is cut out and its ends bent as seen in Fig. 2 the lesson is supported in an upright position.

The operation is as follows:—

The sections 2 and 3 of my novel chart are detached along the crease 4 and the first lesson section as 8 is detached from the section 3 along the creases 12, 13, 14 and 15 and the flaps 17 thereof are folded backwardly along the creases 16 to form an easel-like support, whereby the sectional lesson 8 so cut and folded may be supported without the aid of extraneous devices, as will be understood from Fig. 2. With the section lesson as 8 so cut and visibly positioned in proximity to the typewriter representation in the section 2, the student practices the exercise prescribed by said lesson on the key-board 5 until thorough accuracy and sufficient speed have been acquired. The next succeeding lesson 9 may then be cut out and similarly positioned (see Fig. 2) and practiced and so on until all the remaining lessons 10 and 11 embodied in the section 3 shall have been detached, practiced and mastered.

If additional lessons not found on the section 3 are to be studied, and particularly if an especially composed lesson is to be learned, the proper instructions may be inscribed on any suitable sheet of paper 18 which can be inserted in the slot 19 in the section 2, in advance of the platen 20 and the exercises inscribed on said paper are then practiced on the key-board 5. The slot 19 in addition to providing a holder for the lesson sheet 18 also serves as a spacer or marker to guide the vision of the student. Thus, if, the student begins at the top, only the upper edge of the paper protrudes through the slot 19 and the topmost line is practiced. When the topmost line has been mastered the paper 18 is pulled further through the slot 19 to expose the second line, which is then practiced, and so on, until all the lines on the sheet 18 shall have been mastered, the student being guided or advised as to what line he is practicing by looking at the lowermost visible line or the line just above the slot 19. It is also possible to insert the lesson sections 8, 9, 10 and 11 through the slot 19, if desired, instead of folding the flaps 17 of said lesson sections and supporting them in the manner shown in Fig. 2.

It will be seen from Fig. 1 that the right and left hand margins of the sections 2 and 3 of the chart 1 are not entirely filled up with the representation of the typewriter and the lessons to be practiced in connection therewith, so that ample space is afforded for any desired advertising (not shown). While I have shown the lesson sections 8, 9, 10 and 11 arranged in vertical order upon the body section 3, it is to be understood that any number of lessons may be inscribed and that said lessons may be arranged transversely or longitudinally or in any other desired manner upon the section 3 and the portrayal of the typewriter on the body section 2.

By the use of my novel educational device, I substitute the cardboard key-board 5 having the raised buttons 7 for the key-board of a regular typewriting machine, thereby saving the wear and tear incident to the use of regular typewriting machines by beginners and saving the use of ribbons and paper. By practicing on the pasteboard key-board 5 the beginner acquires the feel or touch of the real key-board of a typewriting machine and learns the positions and collocation of the keys, thus developing the necessary muscular coordination and dexterity at a minimum cost. Furthermore, by the provision of my novel educational device I enable persons who do not possess a typewriting machine to master the art of typewriting without incurring an expense which will otherwise be necessary.

A still further advantage of my novel educational chart is that it possesses some of the characteristics of an amusement chart, thereby arousing interest, which helps to overcome the tediousness incident to the prolonged practice necessary for the mastery of typewriting.

In addition to being extremely inexpensive, my novel device is valuable as an advertising novelty, and the various manufacturers of typewriting machines are thus afforded a novel, attractive, inexpensive, and useful medium of advertising, it being obvious that a person supplied with one of the charts made for use in connection with a standard make of typewriting machine will, after acquiring the necessary efficiency, naturally feel inclined to purchase the particular type of machine for which the lessons inscribed on the chart were made.

It will be clear from the foregoing that my novel device is especially adapted to teach children as well as non-users of the typewriter the key location on a standard typewriter key-board.

I am further enabled to teach the touch typewriting system with the aid of illustrated lessons without the typewriting machine, the embossed or raised simulation of the keys 7 making the touch of the keys more realistic. The slot 19 seen in Figure 1 not only permits the lesson sections seen in the upper portion of Figure 1 to be inserted and retained in position but it also permits a series of different exercises if desired to be inserted and will assist the child and others in spelling. The child or the non-user of the typewriter has an opportunity afforded at slight expense to practice and drill their fingers both for speed and accuracy,—more particularly the class who cannot afford to purchase a real machine.

My novel device is intended for advertising purposes and can be sold by the company handling practically any make of typewriters to their agents or direct to the children or others at a very small cost.

While I have shown the lessons incorporated in the make-up of the blank or folder as being applicable to a certain type of machine, it will be understood that the portrayal of the key-board in the portion 3 of the blank can be changed to conform to the key-board of a different machine from that shown in the lower portion 2 of the blank or folder, so that my novel device is adapted for the educational and instruction purposes of any conventional typewriter now on the market.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim is new and desire to secure by Letters Patent is:—

1. In a device of the character stated, a blank of suitable material, having a typewriter portrayed on a portion thereof, the buttons of the typewriter keys being raised above said blank, and detachable lesson sections portrayed on the opposite portion of said blank, each of said lesson sections comprising a front body portion and end flaps adapted to be deflected to form supports for supporting said body portion in a substantially vertical position when said lesson section is detached.

2. In a device of the character stated, a blank of suitable material, having a typewriter key-board and platen portrayed on the lower portion thereof, the buttons of the typewriter keys being raised above said blank, and the upper portion of said blank having delineated thereon a series of detachable lesson sections arranged in sequence, each of said lesson sections comprising a front body portion and end flaps adapted to be deflected to form supports for supporting said body portion in a substantially vertical position when said lesson section is detached.

3. In a device of the character stated, a blank of suitable material, having a typewriter keyboard and platen portrayed on the lower portion thereof, the buttons of the typewriter keys being raised above said blank, and the upper portion of said blank having delineated thereon a series of detachable lesson sections arranged in sequence, each of said lesson sections comprising a front body portion and end flaps adapted to be deflected to form supports for supporting said body portion in a substantially vertical position when said lesson section is detached, there being a slot in the lower portion of said blank in advance of said platen for the insertion of an auxiliary instruction sheet, said slot also serving to train the eye on the line of instruction being practiced.

4. In a device of the character stated, a blank comprising two body portions separated by a crease, a typewriter key-board having its buttons formed in relief on one of said body portions, and a plurality of lesson sections on the opposite body portion, each of said lesson sections being separated from said body portion by creases, and being detachable from said body portion along said creases, whereby a front body portion and rearwardly foldable end flaps are produced for supporting said section in a vertical position.

5. In a device of the character stated, a blank comprising two body portions separated by a crease, a typewriter key-board having its buttons formed in relief on one of said body portions, a plurality of lesson sections being separated from said body portion by creases, and being detachable from said body portion along said creases, and end flaps for said lesson sections adapted to be deflected to form supports therefor.

6. In a device of the character stated, a blank comprising two body portions separated by a crease, a typewriter key-board formed in relief on one of said body portions, and a plurality of lesson sections on the other of said body portions, each of said lesson sections being separated from said body portion by creases, and being detachable from said body portion along said creases, there being a guide slot in said first mentioned body portion for receiving and supporting a lesson section detached from its body portion in proximity to said keyboard.

HARRY S. C. BACON.